United States Patent
Kennedy (10) Patent No.: US 10,244,234 B2
(45) Date of Patent: Mar. 26, 2019

(54) ADAPTIVE COMPRESSION RATE CONTROL

(71) Applicant: Ellation, Inc., San Francisco, CA (US)

(72) Inventor: Chris Kennedy, Alameda, CA (US)

(73) Assignee: Ellation, Inc., San Francisco, CA (US)

( * ) Notice: Subject to any disclaimer, the term of this patent is extended or adjusted under 35 U.S.C. 154(b) by 43 days.

(21) Appl. No.: 15/356,510

(22) Filed: Nov. 18, 2016

(65) Prior Publication Data

US 2017/0150145 A1 May 25, 2017

Related U.S. Application Data (60) Provisional application No. 62/258,259, filed on Nov. 20, 2015.

(51) Int. Cl.
| | |
|---|---|
| *H04N 19/115* | (2014.01) |
| *H04N 19/14* | (2014.01) |
| *H04N 19/154* | (2014.01) |
| *H04N 19/137* | (2014.01) |

(52) U.S. Cl.
CPC ......... *H04N 19/115* (2014.11); *H04N 19/137* (2014.11); *H04N 19/14* (2014.11); *H04N 19/154* (2014.11)

(58) Field of Classification Search
CPC .... H04N 19/115; H04N 19/14; H04N 19/154; H04N 19/132
See application file for complete search history.

(56) References Cited

U.S. PATENT DOCUMENTS

| | | | | |
|---|---|---|---|---|
| 6,937,770 | B1* | 8/2005 | Oguz | H04N 19/176 375/240.2 |
| 7,549,052 | B2* | 6/2009 | Haitsma | G06F 17/30787 380/54 |
| 8,184,691 | B1* | 5/2012 | Henson | H04N 7/167 375/240.02 |
| 8,688,731 | B2* | 4/2014 | Ramanathan | G06F 17/30799 707/747 |
| 10,080,062 | B2* | 9/2018 | Neumeier | G06F 17/30799 |
| 2002/0178410 | A1* | 11/2002 | Haitsma | G06F 17/30787 714/709 |
| 2004/0025025 | A1* | 2/2004 | Venkatesan | G06F 17/30247 713/176 |

(Continued)

OTHER PUBLICATIONS

Li et al., "Distributed Video Coding Based on Conditional Entropy Hash"; 2010 © IEEE, DOI 10-1109/CASoN2010-93.*

(Continued)

*Primary Examiner* — Dramos Kalapodas
(74) *Attorney, Agent, or Firm* — Fenwick & West LLP (57) ABSTRACT

Disclosed by way of example embodiments are a system and a computer implemented method for adaptively encoding a video by changing compression rates for different frames of the video. In one aspect, two frames of a video are compared to determine a compression rate for compressing one of the two frames. Hash images may be generated for corresponding frames for the comparison. By comparing two hash images, a number of stationary objects and a number of moving objects in the two frames may be determined. Moreover, a compression rate may be determined according to the number of stationary objects and the number of moving objects.

16 Claims, 8 Drawing Sheets

(56) References Cited

U.S. PATENT DOCUMENTS

2010/0318515 A1\* 12/2010 Ramanathan ..... G06F 17/30799
707/723
2013/0148721 A1\* 6/2013 Chen ..................... G09G 5/001
375/240.12
2013/0314429 A1\* 11/2013 Croxford ................. G06T 1/60
345/531

OTHER PUBLICATIONS

Yu-Gang Jiang et al., "Query-Adaptive Image Search With Hash Codes" 2010 © IEEE.\*

Zhihong Li et al., "Distributed Video Coding Based on Conditional Entropy Hash"; 2010 © IEEE, DOI 10-1109/CASoN2010-93Zhihong (Year: 2010).\*

\* cited by examiner

ADAPTIVE COMPRESSION RATE CONTROL

CROSS-REFERENCE TO RELATED APPLICATION

This application claims priority under 35 U.S.C. § 119(e) from copending U.S. Provisional Patent Application No. 62/258,259, entitled "Perceptual Rate Factor (v1.0) x264 Managed CRF Rate Control for Compression," filed on Nov. 20, 2015, which is incorporated by reference herein in its entirety.

BACKGROUND

1. Field of Art

This application relates to a system and a computer implemented method of adaptively controlling a compression rate for encoding a video.

2. Description of the Related Art

Video compression allows transmission of a large video from a server to a client device. A server compresses a video and transmits the compressed video to a client device. The client device decompresses the compressed video from the sink device, and renders the decompressed video for display to a user.

In one example, the server encodes the video by a predetermined compression rate. A video compressed according to a higher compression rate has a smaller size than a video compressed according to a lower compression rate. However, the video compressed according to the higher compression rate may suffer from more loss in the video quality than the video compressed according to the lower compression rate.

In one conventional approach, the server encodes different videos by different compression rates according to types of videos (e.g., a game, live action movie, animation, cartoon, sports, etc.). In particular, certain types of videos may be more affected by a loss of video quality than other types of videos, and these types of videos may be compressed according to a lower compression rate than compression rates for other types of videos. For example, a loss of detailed components of objects due to compression in a live action movie may be more noticeable than a loss of detailed components of objects due to compression in a cartoon or an animation. Hence, the server may compress a live action movie according to a lower compression rate than an animation or a cartoon.

Compressing each video with an assigned compression rate suffers from a few drawbacks. In one example, a video may include a first set of frames with more moving objects and a second set of frames with more stationary objects. A loss of detailed components of the moving objects may be less noticeable than a loss of detailed components of the stationary objects. Compressing the video according to a fixed compression rate may cause the first set of frames to be under-compressed. That is, the first set of frames may be compressed according to a higher compression rate than the fixed compression rate without noticeable degradation in the video quality. Moreover, compressing the video according to the fixed compression rate may cause the second set of frames to be over-compressed. That is, the second set of frames compressed according to the fixed compression rate may suffer from noticeable degradations in the video quality. Therefore, a conventional approach of compressing a video is unable to adaptively compress different frames of the videos.

SUMMARY

Disclosed by way of example embodiments are a system and a computer implemented method for adaptively encoding a video by changing compression rates for different frames of the video.

In one aspect, two frames of a video are compared to determine a compression rate for compressing one of the two frames. Hash images may be generated for corresponding frames (or images) for the comparison. A hash image is a finger print of a corresponding frame (or an image), and indicates a particular attribute of the corresponding frame. For example, a hash image may indicate structural components of objects in the image, and may suppress detailed components of the objects. By comparing two hash images, a number of stationary objects and a number of moving objects in the two frames may be determined. Moreover, a compression rate may be determined according to the number of stationary objects and the number of moving objects. For example, responsive to determining that a larger number of moving objects than stationary objects is included in the two frames, a higher compression rate than a threshold rate (e.g., average compression rate) may be determined to be applied for compressing one of the two frames. Similarly, responsive to determining that a larger number of stationary objects than moving objects is included in the two frames, a lower compression rate than the threshold rate maybe determined to be applied for compressing one of the two frames.

Advantageously, a video including different frames with varying number of stationary objects or moving objects can be adaptively compressed. As a result, over-compressing or under-compressing of different frames of the video can be eschewed.

DETAILED DESCRIPTION

The figures and the following description relate to embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Computing Environment

Figure 1:
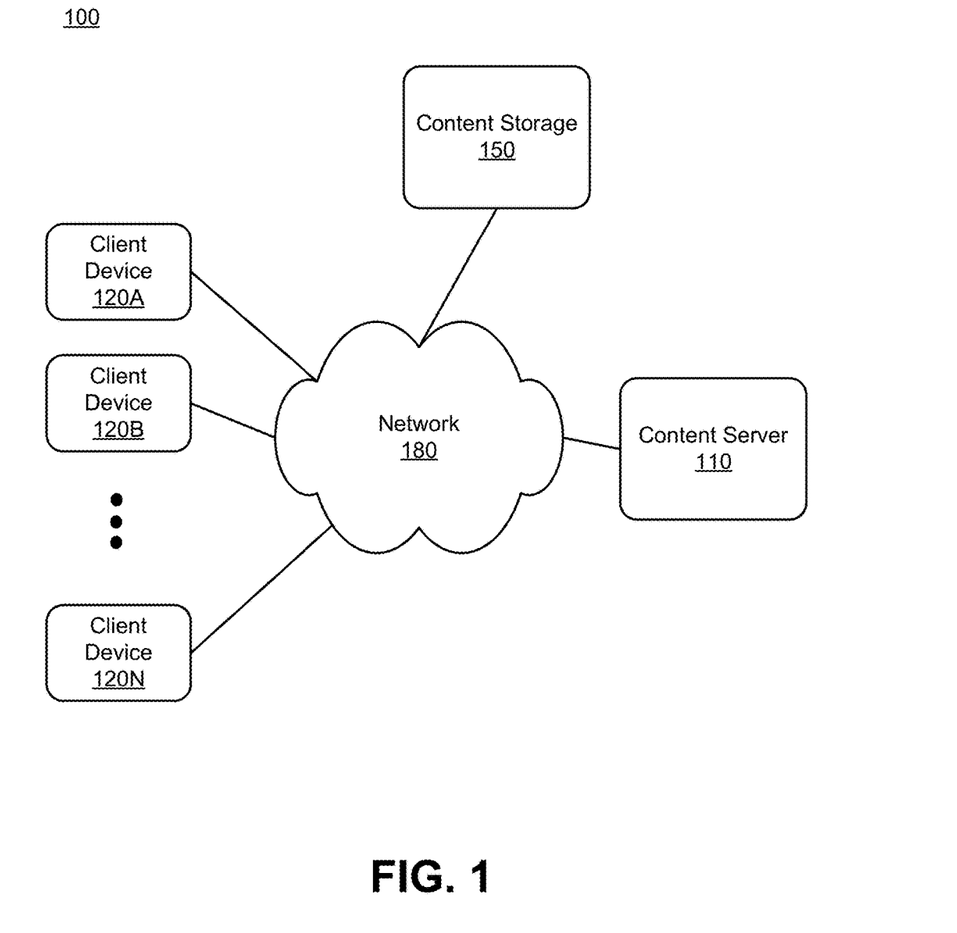
FIG. 1 illustrates a block diagram illustrating a content server that adaptively encodes videos and streams the encoded videos to one or more client devices, in accordance with an embodiment.

FIG. 1 illustrates a computing environment 100 for adaptively compressing videos and streaming the compressed videos, according to one embodiment. The computing environment 100 includes a content server 110, client devices 120A, 120B . . . 120N (herein referred to as "a client device"), content storage 150, and a network 180. The content server 110, client devices 120, and the content storage 150 are communicatively coupled to each other through the network 180. Although single instances of the entities are illustrated, multiple instances may be present. For example, multiple content servers 110 or additional content storage 150 may be implemented.

The network 180 enables communications among the entities connected to them through one or more local-area networks and/or wide-area networks. In one embodiment, the network 180 is the Internet and uses standard wired and/or wireless communications technologies and/or protocols. The network 180 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. Similarly, the networking protocols used on the networks 180 can include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP).

The data exchanged over the network 180 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

The client device 120 receives a data stream representing a video from the content server 110 through the network 180, and presents the video to a user. The data stream may be an encoded video (or a compressed video). The client device 120 decodes the encoded video or decompresses the compressed video for presentation of the video. Examples of the client device 120 include a desktop, a laptop, a tablet, a mobile device, a smart television, and a wearable device. The client device 120 may include software such as a video player to support presentation of embedded digital content.

The content storage 150 is a storage machine that stores one or more videos. The content storage 150 may receive a request for a video from a client device 120 or a content server 110, and provides the requested video to the content server 110. Examples of the content storage 150 include a desktop, a laptop, a server computer, a smartphone, a tablet, a mobile device, a camera, and a video recording device. In some embodiments, the content storage 150 may be integrated with the content server 110 as a single component.

The content server 110 receives a request for a video, for example, from a client device 120, and generates a data stream of the requested video for a transmission to the client device 120. Examples of the content storage 150 include a desktop, a laptop, a server computer, a smartphone, a tablet, a mobile device, a camera, and a video recording device. The content server 110 retrieves the requested video from the content storage 150, and encodes or compresses the requested video to generate the data stream. In one aspect, the content server 110 adaptively encodes or adaptively compresses different frames of the video. Specifically, the content server 110 adaptively changes a compression rate, based on an amount of moving objects and stationary objects in a frame. For example, the content server 110 compresses a frame including more moving objects than stationary objects according to a higher compression rate than a threshold rate (e.g., average compression rate), and compresses another frame including more stationary objects than moving objects according to a lower compression rate than the threshold rate. Detailed structure and operation of the content server 110 is provided below with respect to FIGS. 2 through 7 below.

Figure 2:
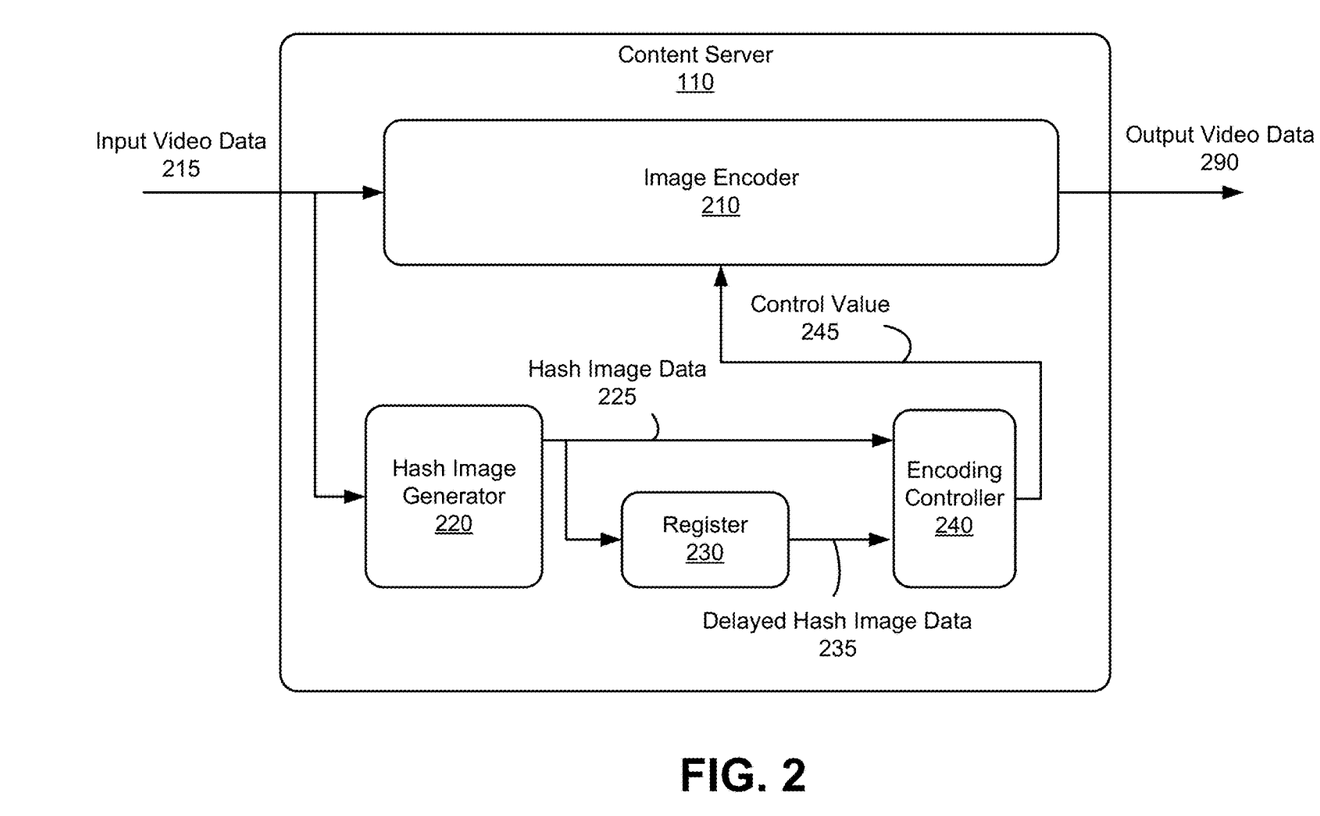
FIG. 2 illustrates a block diagram of a content server in accordance with an embodiment.

FIG. 2 illustrates a block diagram of a content server 110 in accordance with an embodiment. In one embodiment, the content server 110 includes an image encoder 210, a hash image generator 220, a register 230, and an encoding controller 240. These components may be implemented as hardware, software, or a combination of them. Together, these components operate together to receive input video data 215 representing a video, and adaptively encode (or compress) the input video data to generate output video data 290 as a video stream. In other embodiments, the content server 110 includes additional, fewer, or different components in different arrangements than shown in FIG. 2.

In one example configuration, the image encoder 210 receives input video data 215 and encodes (or compresses) the input video data 215 according to a control value 245 to generate output video data 290. The input video data 215 digitally represents a video to be displayed, where a video includes multiple frames (or images). The hash image generator 220, the register 230, and the encoding controller 240 together generate the control value 245 according to the input video data 215. The control value 245 may be changed for different frames, for example, depending on a number of moving objects, a number of stationary objects, or both. Hence, an amount of compression performed by the image encoder 210 may be adaptively changed for different frames.

The image encoder 210 encodes (or compresses) the input video data 215 according to the control value 245 to generate the output video data 290. The control value 245 indicates an amount of compression to be applied to the input video data 215. In one example, the image encoder 210 is a H.264 encoder that performs encoding/compression according to a constant rate factor (CRF). Detailed encoding process performed by H.264 encoder is further provided in http://slhck.info/articles/crf, which is incorporated by reference herein in its entirety. The H.264 may encode or compress the input video data 215, according to the varying CRF for different frames of the input video data. Hence, a compression amount of different frames can be adaptively changed.

The hash image generator 220 receives input video data 215 corresponding to a frame of a video and generates the hash image data 225 corresponding to the frame. The hash image data digitally represents a hash image. The hash image is a finger print of the frame, and indicates a particular attribute (e.g., structural components) of the corresponding frame. The hash image generator 220 may extract structural components of the frame, while suppressing detailed components of the frame. The hash image generator 220 outputs the hash image data 225 to a first input of the encoding controller 240 and an input of the register 230. Detailed implementation of the hash image generator 220 is described below with respect to FIGS. 4 and 5.

The register 230 receives the hash image data 225 corresponding to the frame, and outputs delayed hash image data 235 to a second input of the encoding controller 240. In one approach, the register 230 delays the hash image data 225 by one frame to output the delayed hash image data 235. Hence, the delayed hash image data 235 correspond to a preceding frame of the frame. Alternatively, the register 230 delays the hash image data 225 by any number frames to output the delayed hash image data 235.

The encoding controller 240 receives the hash image data 225 and the delayed hash image data 235 corresponding to two different frames, and generates a control value 245. The encoding controller 240 provides the control value 245 to the image encoder 210. The encoding controller 240 generates the control value 245 by comparing the hash image data 225 and the delayed hash image data 235. In one aspect, the encoding controller 240 obtains a hamming distance indicating a difference between the hash image data 225 and the delayed hash image data 235, and generates the control value based on the hamming distance. In one example, a larger hamming distance indicates that a larger number of objects in the frames are in motion, where a smaller hamming distance indicates a larger number of objects in the frames are stationary. For example, assuming that the first hash image data is represented as "1011101" and the second hash image data is represented as "1001001", the hamming distance between the two hash image data becomes "2", because two bits are different between the first hash image data and the second hash image data. When a larger number of objects are determined to be in motion according to the hamming distance, the encoding controller 240 generates the control value 245 corresponding to a higher compression rate, because a loss of detailed components of moving objects is not noticeable to a user. In addition, when fewer objects are determined to be in motion according to the hamming distance, the encoding controller 240 generates the control value 245 corresponding to a lower compression rate, because a loss of detailed components of stationary objects is noticeable to the user. Hence, the hamming distance may be proportional to the compression rate. Proportional herein refers to a linear or non-linear increase in one component with respect a linear increase in another component. For example, as the hamming distance increases, the compression rate may increase linearly or non-linearly. Detailed implementation of the encoding controller 240 is described below with respect to FIGS. 6 and 7.

Figure 3:
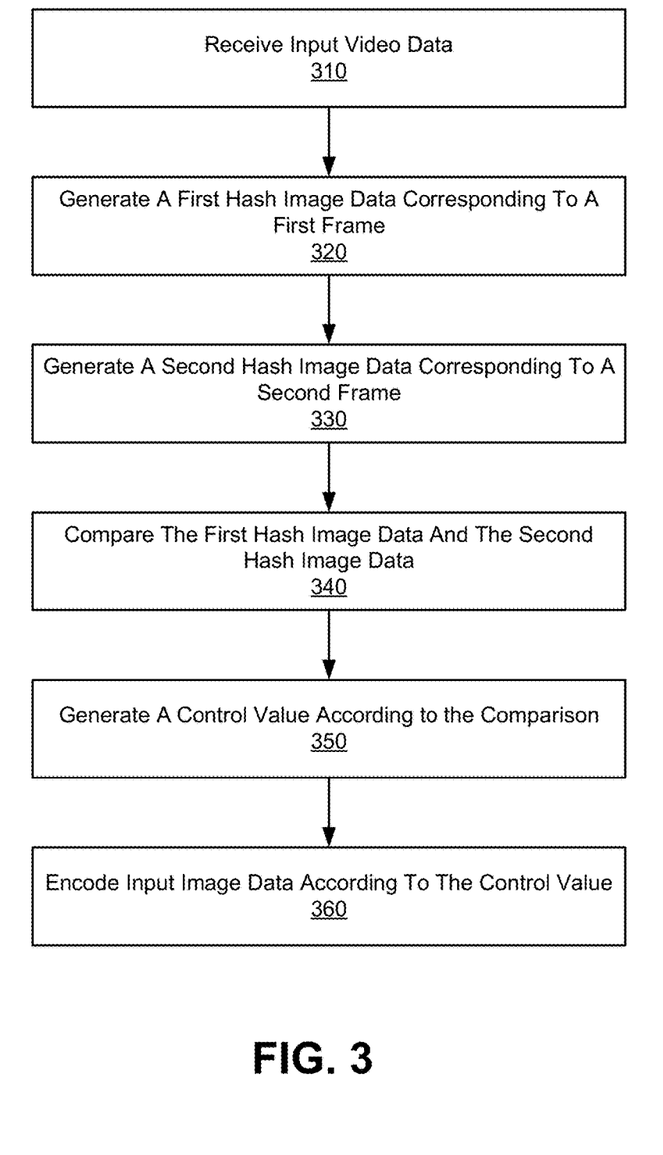
FIG. 3 is an example flow chart illustrating a process of adaptively encoding a video, in accordance with an embodiment.

FIG. 3 is an example flow chart illustrating a process of adaptively encoding different frames of a video, in accordance with an embodiment. The steps in FIG. 3 may be performed by, for example, the content server 110 shown in FIG. 2. In other embodiments, additional, fewer, or different steps may be performed.

The content server 110 receives 310 input video data 215 corresponding to a first frame of a video. The content server 110 may receive a request from a client device 120 to provide a data stream for a video, and the content server 110 may retrieve the requested video from the content storage 150.

The content server 110 generates 320 first hash image data corresponding to the first frame. The first hash image data may indicate structural components in the first frame. The content server 110 may store the first hash image data at the register 230.

The content server 110 receives input video data corresponding to a second frame of the video, and generates 330 second hash image data corresponding to the second frame. The second frame may be subsequent to the first frame or two or more frames after the first frame.

The content server 110 compares 340 the first hash image data and the second hash image data. In one example, the content server 110 obtains a hamming distance between the first hash image data and the second hash image data, and determines an amount of difference in structural components between the first frame and the second frame based on the hamming distance. For example, the content server 110 determines that the second frame has more moving objects than stationary objects, responsive to a large hamming distance between the first frame and the second frame. Similarly, the content server 110 determines that the second frame has more stationary objects than moving objects, responsive to a low hamming distance between the first frame and the second frame. In other embodiments, other representations or other indicators that indicate structural components of objects may be used instead of hash image data for determining a hamming distance.

The content server 110 generates 350 a control value according to the comparison. In one approach, the content server 110 generates the control value corresponding to the amount of moving objects with respect to the amount of stationary objects. If a larger number of moving objects are determined to be included than stationary objects, the content server 110 generates the control value such that a compression rate higher than a threshold rate (e.g., average compression rate) is applied to the encoding (or compression). Conversely, if a larger number of stationary objects are determined to be included than moving objects, the content server 110 generates the control value such that a compression rate lower than the threshold rate is applied to the encoding (or compression). In one aspect, the control value is a CRF for controlling a compression rate of a H.264 encoder. Assuming that CRF has a range between 0~51, an average CRF value corresponding to the average compression rate may be 25.

The content server 110 encodes 360 input image data according to the control value. In one example, the content server 110 encodes the second frame of the input image data according to the control value.

The process may be repeated for additional frames of the input video data. Hence, different control values can be generated for different frames, for example, according to variance in the structural components in the frames. Moreover, different frames within a video can be adaptively encoded according to different control values.

In other embodiments, different hash image generator than shown in FIG. 3 may be implemented to obtain hash image data 225.

Figure 4:
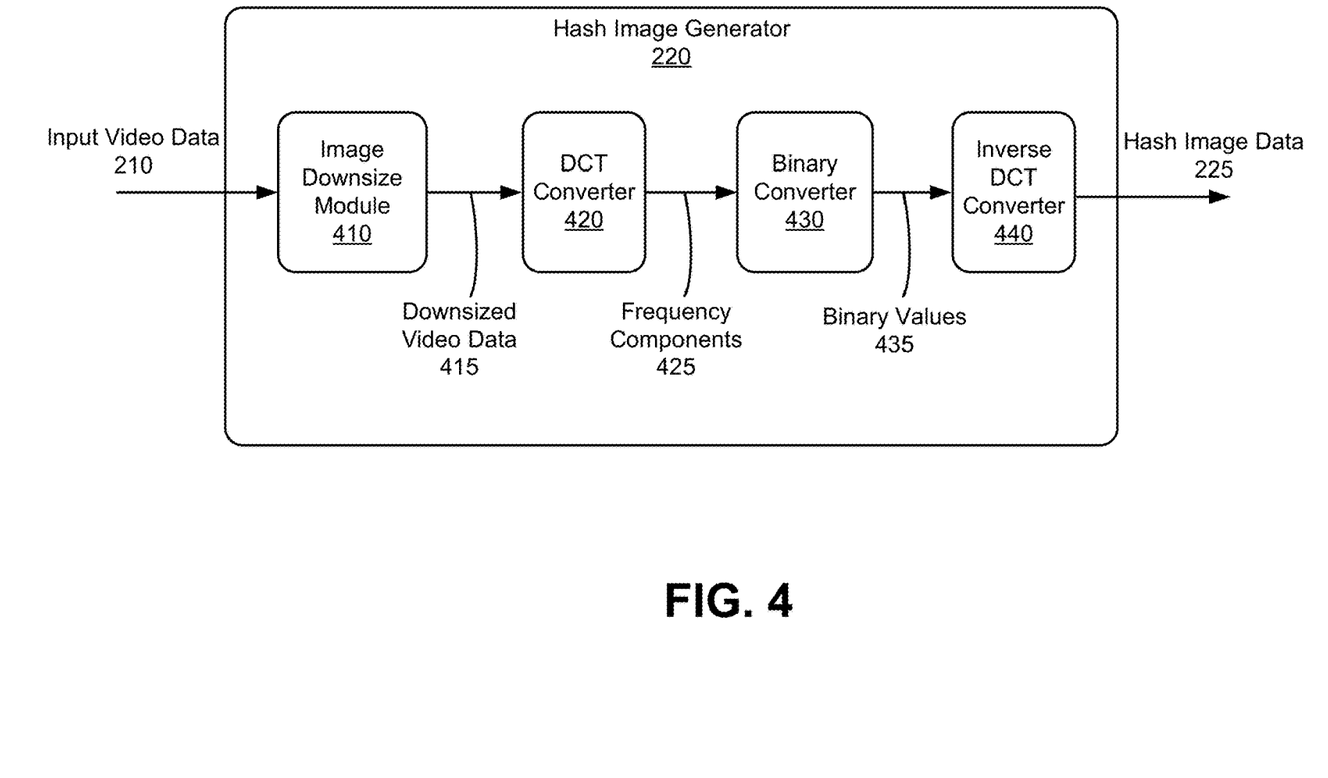
FIG. 4 illustrates an example hash image generator, in accordance with an embodiment.

FIG. 4 illustrates an example hash image generator 220, in accordance with an embodiment. In one embodiment, the hash image generator 220 includes an image downsize module 410, a DCT converter 420, a binary converter 430, and an inverse DCT converter 440. These components may be implemented as hardware, software, or a combination of them. Together, these components operate together to receive the input video data 215 representing a video, and remove detailed components in the input video data 215 to generate the hash image data 225 including structural components. In other embodiments, the hash image generator 220 includes additional, fewer, or different components in different arrangements than shown in FIG. 4.

The image downsize module 410 receives the input video data 215 and downsizes the input video data 215 to generate the downsized video data 415. For example, the image downsize module 410 downsizes a frame of the input video data 215 having a 1080×720 resolution or higher (e.g., 4K resolution) into an 8×8 square. Regardless of a scale, aspect ratio or size of a file, the input video data 215 may be reduced to fit the 8×8 square. The image downsize module 410 coverts the downsized image data in the 8×8 square to a grayscale, and outputs the downsized image in grayscale as the downsized video data 415.

The DCT converter 420 performs frequency transformation on the downsized video data 415 to obtain frequency components 425 of the downsized video data 415. In particular, a frequency transformation converts pixel values represented in a scalar domain into corresponding frequency values in a frequency domain. For example, a discrete cosine transformation (DCT) may be performed as the frequency transformation. DCT allows transformation of the pixels values in the scalar domain into the frequency domain including a frequency range that is perceptually sensitive to the human visual system. Hence, hash image data obtained according to the DCT and hamming distance obtained based on the hash image data can indicate structural components of an image that are perceptually significant to a human visual system.

In one implementation, the DCT converter 420 applies 32×32 DCT on the 8×8 downsized video data 415. The DCT converter 420 may output frequency components 425 of the top 8×8 portion from the output of the 32×32 DCT, while disregarding the rest from the output of the DCT. In other embodiments, the DCT converter 420 may be replaced with other frequency converter that performs frequency transformation on the downsized video data 415.

The binary converter 430 receives the frequency components 425, and converts the frequency components 425 into binary values 435. In one example, the binary converter 430 obtains an average value of the frequency components 425, and compares each of the frequency components 425 with the average value. Responsive to a frequency component being higher than the average value, the binary converter 430 replaces that frequency component with '1'. Similarly, responsive to a frequency component being lower than the average value, the binary converter 430 replaces that frequency component with '0'. In some embodiments, the binary converter 430 removes a first term in the frequency components before obtaining the average value, to remove any DC bias (or a low frequency component). The binary converter 430 outputs a string (or an array) of '1' and '0' replacing the frequency components as binary values.

The inverse DCT converter 440 converts the binary values 435 in frequency domain into the scalar domain to generate the hash image data 225. The inverse DCT performed may be inverse to the DCT performed by the DCT converter 420. In other embodiments in which a different frequency transformation is applied to the downsized video data 415, a corresponding inverse transformation may be applied to the binary values 435 to obtain the hash image data 225. The hash image data 225 obtained based on the binary values '1' and '0' lack high frequency components that contribute to detailed components in the image, but indicate structural components in a reduced format. Hence, the hash image data 225 can improve efficiency when comparing structural components of different frames.

Figure 5:
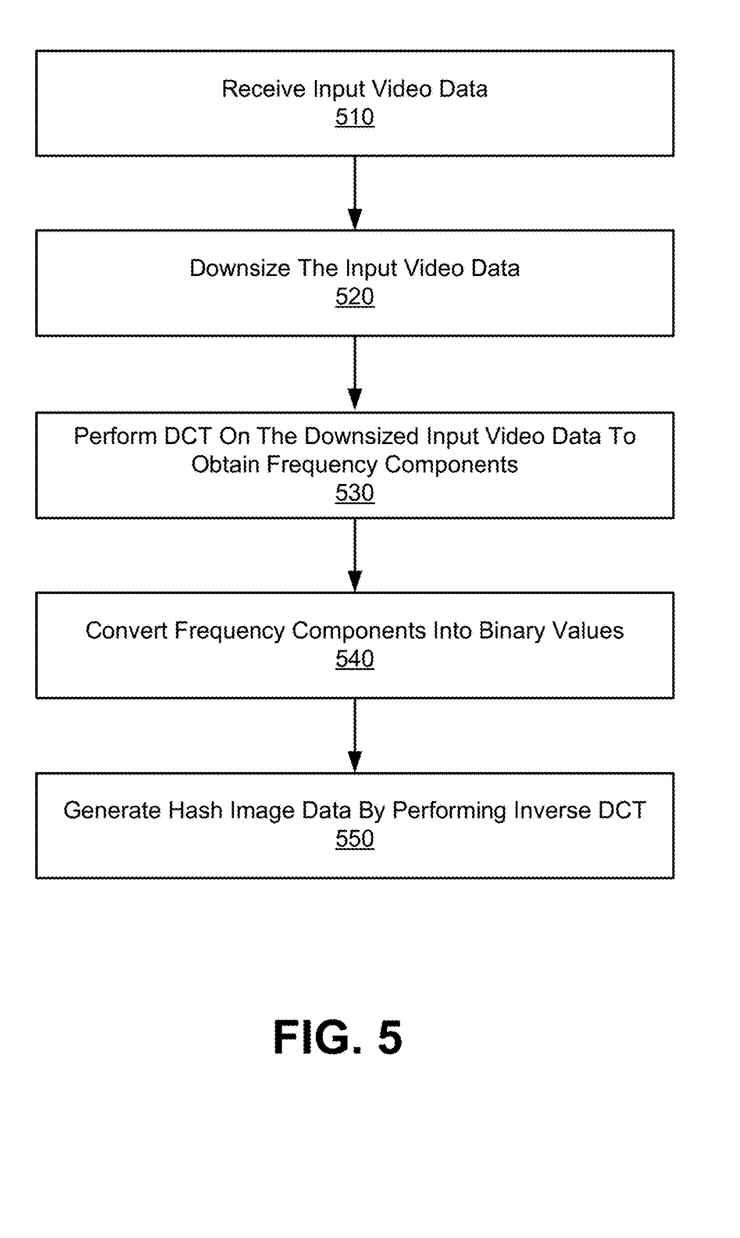
FIG. 5 is an example flow chart illustrating a process of generating hash image data, in accordance with an embodiment.

FIG. 5 is an example flow chart illustrating a process of generating a hash image, in accordance with an embodiment. The steps in FIG. 5 may be performed by, for example, the hash image generator 220 shown in FIG. 4. In other embodiments, additional, fewer, or different steps may be performed.

The hash image generator 220 receives 510 input video data 215 corresponding to a frame of a video.

The hash image generator 220 downsizes 520 the frame of the input video data 215 to obtain downsized video data 415. For example, the hash image generator 220 downsizes the frame of the input video data in any format or any size into 8×8 square, and converts the 8×8 square into a grayscale.

The hash image generator 220 performs 530 DCT to convert the downsized video data 415 in a scalar domain into a frequency domain. In other embodiments, other types of frequency transformation may be performed on downsized video data 415.

The hash image generator 220 converts 540 frequency components 425 of the downsized video data 415 in the frequency domain into binary values. In one aspect, the hash image generator 220 removes frequency components lower than a threshold frequency to remove DC bias, and obtains an average value of the remaining frequency components. Moreover, the hash image generator 220 compares each of the frequency components of the downsized video data 415 with the average value, and converts each of the frequency components into one of two binary values '0' and '1' according to the comparison. For example, a frequency component above the average value is converted into '1' and a frequency component below the average value is converted into '0'.

The hash image generator 220 generates 550 hash image data in the scalar domain by performing inverse DCT on the binary values in the frequency domain. By converting frequency components of the downsized video data 415 in the frequency domain into binary values, and performing inverse DCT on the binary values, structural components of the frame can be extracted while detailed components of the frame are filtered out.

Figure 6:
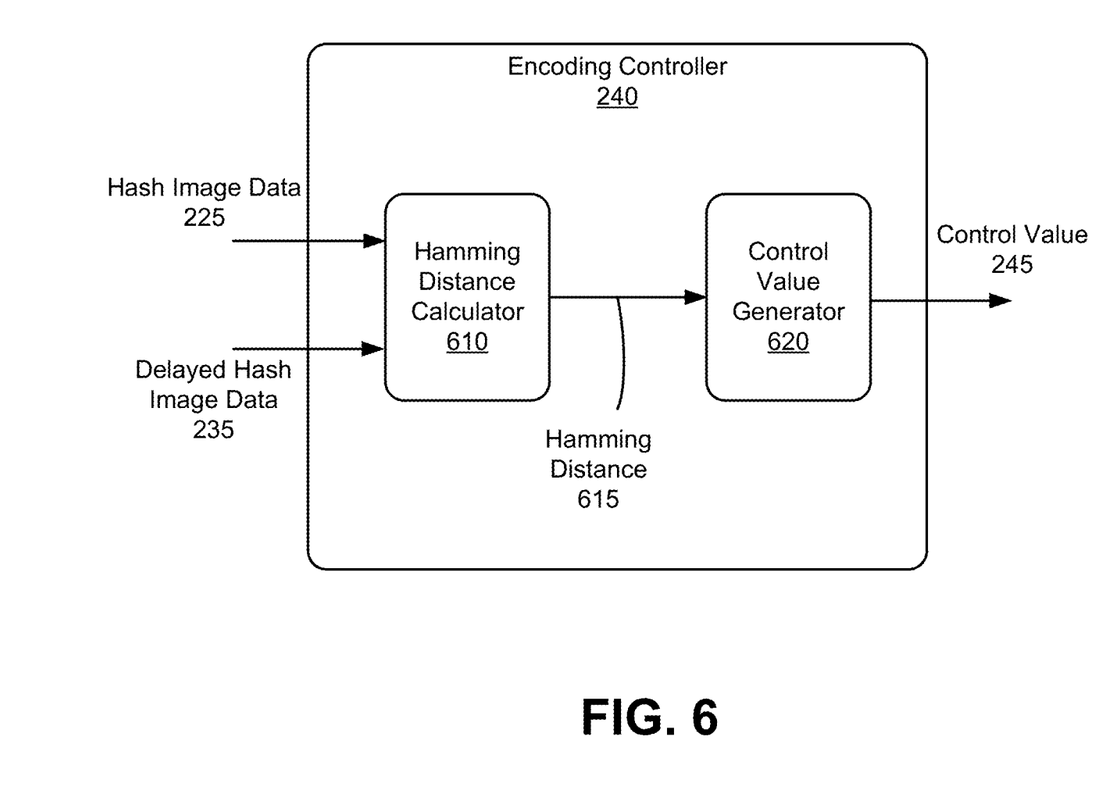
FIG. 6 illustrates an example encoding controller, in accordance with an embodiment.

FIG. 6 illustrates an example encoding controller 240, in accordance with an embodiment. In one embodiment, the encoding controller 240 includes a hamming distance calculator 610 and a control value generator 620. These components may be implemented as hardware, software, or a combination of them. Together, these components operate together to receive hash image data 225 and delayed hash image data 235, and generate the control value 245. In other embodiments, the encoding controller 240 includes additional, fewer, or different components in different arrangements than shown in FIG. 6.

The hamming distance calculator 610 receives the hash image data 225 and the delayed hash image data 235, and generates a hamming distance 615 based on the hash image data 225 and the delayed hash image data 235. The hamming distance calculator 610 may obtain the hamming distance 615 by calculating a difference between two hash image data. The hamming distance 615 represents an amount of difference between two image data. Because each of the two hash image data 225, 235 indicates structural components of its respective frame, the hamming distance of two hash image data 225, 235 indicates whether structural components of one or more objects in two frames are identical or not. Hence, the hamming distance indicates whether one or more objects are in motion or stationary.

The control value generator 620 receives the hamming distance 615 and generates the control value 245 according to the hamming distance 615. For example, responsive to the hamming distance 615 indicating a larger difference between two hash image data 225, 235 than a threshold difference, (i.e., more number of moving objects than stationary objects in two frames), the control value generator 620 generates the control value 245 corresponding to a higher compression rate than an average compression rate. The threshold difference may be an average hamming distance of a plurality of frames in the video and correspond to the average compression rate. For another example, responsive to the hamming distance 615 indicating a smaller difference between two hash image data 225, 235 than the threshold difference, (i.e., a larger number of stationary objects than moving objects in two frames), the control value generator 620 generates the control value 245 corresponding to a lower compression rate than the average compression rate.

In one embodiment, the control value generator 620 generates an intermediate control value, and further generates the control value 245 based on the intermediate control value. For example, the control value generator 620 generates a perceptual rate control factor (PRF) as the intermediate control value according to the hamming distance, and generates a constant rate factor (CRF) for a frame based on the PRF. In one example, a higher control value corresponds to higher amount of compression and a lower control value corresponds to lower amount of compression. In this example, if the hamming distance is equal to or larger than a predetermined hamming value, the control value generator 620 subtracts a predetermined PRF or a PRF for a previous frame by a predetermined amount (also referred to as "crfrange" herein) to obtain the PRF for a current frame. If the hamming distance is below the predetermined hamming value, the control value generator 620 subtracts the predetermined PRF or the PRF for the previous frame by another amount less than the predetermined amount to obtain the PRF for the current frame, where said another amount is proportional to a ratio between the hamming distance and the predetermined hamming value. The PRF for the current frame may be used to shift a control value for the previous frame or a predetermined control value to generate the control value (e.g., CRF) for the current frame in a manner that the control value generated is proportional to the hamming distance.

In one embodiment, the control value is modified according to additional factors that indicate motions of objects in the frames before performing encoding by the image encoder 210. Examples of additional factors include a difference in a peak signal to noise ratio (PSNR), pixel variance between two frames, a number of dark images below a brightness threshold, etc. For example, the control value generator 620 obtains a difference in a PSNR between two frames, and determines the control value according to the ratio between the difference in the PSNR and a predetermined threshold PSNR. For another example, the control value generator 620 obtains a pixel variance (i.e., difference in pixel values) between two frames, and determines the control value according to a ratio between the pixel variance and a predetermined threshold variance. For another example, the control value generator 620 obtains a number of pixels of a frame having a brightness level below a predetermined brightness threshold, and determines the control value according to a ratio between the number of pixels and a total number of pixels (e.g., 60 pixels) in the frame. In an embodiment in which a H.264 encoder is implemented as the image encoder 210, the CRF can be determined according to example codes in Table 1 below.

TABLE 1

Example Code For Determining CRF

```
// Decrease CRF for Hamming Distance between last and current frame
if (prf->hamming_ diff < prf->hammthresh)
    prf->prf -= FFMIN(crfrange, ((float) prf->hamming_ diff / prf->hammthresh) * crfrange );
else
    prf->prf -= crfrange;
// Decrease CRF for PSNR variance between last and current frame
prf->prf -= FFMIN(crfrange, prf->psnr var);
// Decrease CRF for Pixel Variance between last and current frame
if (prf->variance < prf->variancethresh)
    prf->prf -= FFMIN(crfrange, ((float)prf->variance / prf->variancethresh) * crfrange);
else
    prf->prf -= crfrange;
// Decrease CRF granularly per amount of black pixels
// if the variance or hamming indicates motion
prf->prf -= FFMIN(crfrange, (float)prf->pblack / 60.0);
```

Figure 7:
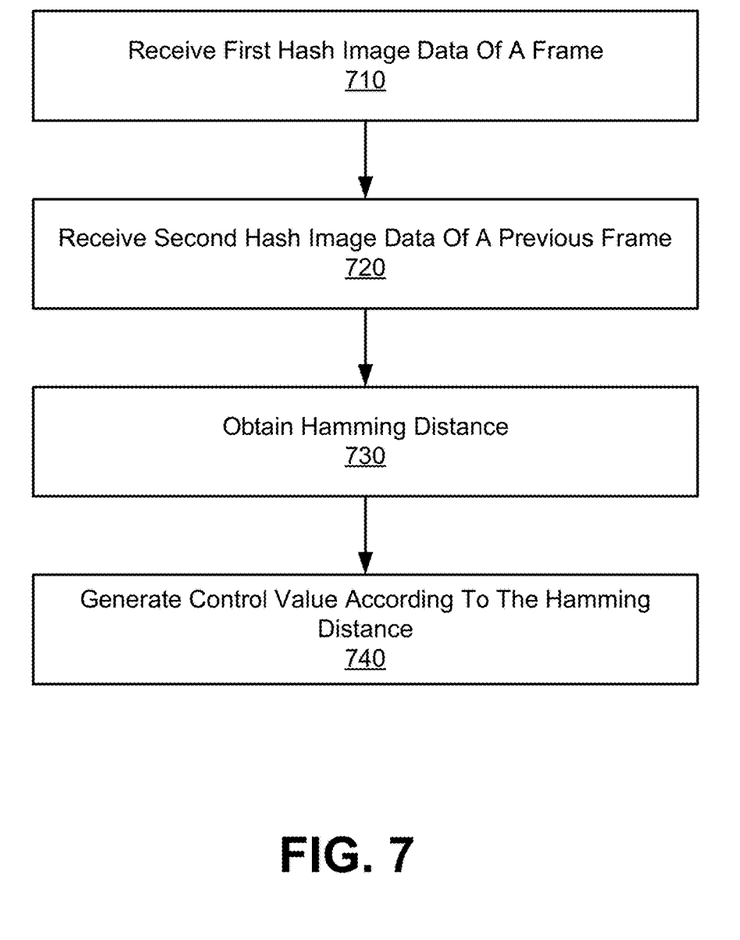
FIG. 7 is an example flow chart illustrating a process of generating a control value for adjusting a compression rate, in accordance with an embodiment.

FIG. 7 is an example flow chart illustrating a process of generating a control value for adjusting a compression rate, in accordance with an embodiment. The steps in FIG. 7 may be performed by, for example, the encoding controller 240 shown in FIG. 6. In other embodiments, additional, fewer, or different steps may be performed.

The encoding controller 240 receives 710 first hash image data corresponding to a first frame of a video, and receives 720 second hash image data corresponding to a second frame of the video. Each hash image data indicates structural components of its respective frame. The second frame may immediately precede the first frame. Alternatively, the second frame may precede the first frame by any number of frames.

The encoding controller 240 obtains 730 a hamming distance between the first hash image data and the second hash image data. The hamming distance indicates a number of moving objects with respect to stationary objects included in the first frame and the second frame.

The encoding controller 240 generates 740 a control value according to the hamming distance. Assuming that an average hamming distance corresponds to an average compression rate, responsive to a hamming distance being larger than the average hamming distance, the encoding controller 240 generates the control value causing the image encoder 210 to perform encoding at a higher compression rate than the average compression rate. Similarly, responsive to a hamming distance being less than the average hamming distance, the encoding controller 240 generates the control value causing the image encoder 210 to perform encoding at a lower compression rate than the average compression rate.

Computing Machine Architecture

Figure 8:
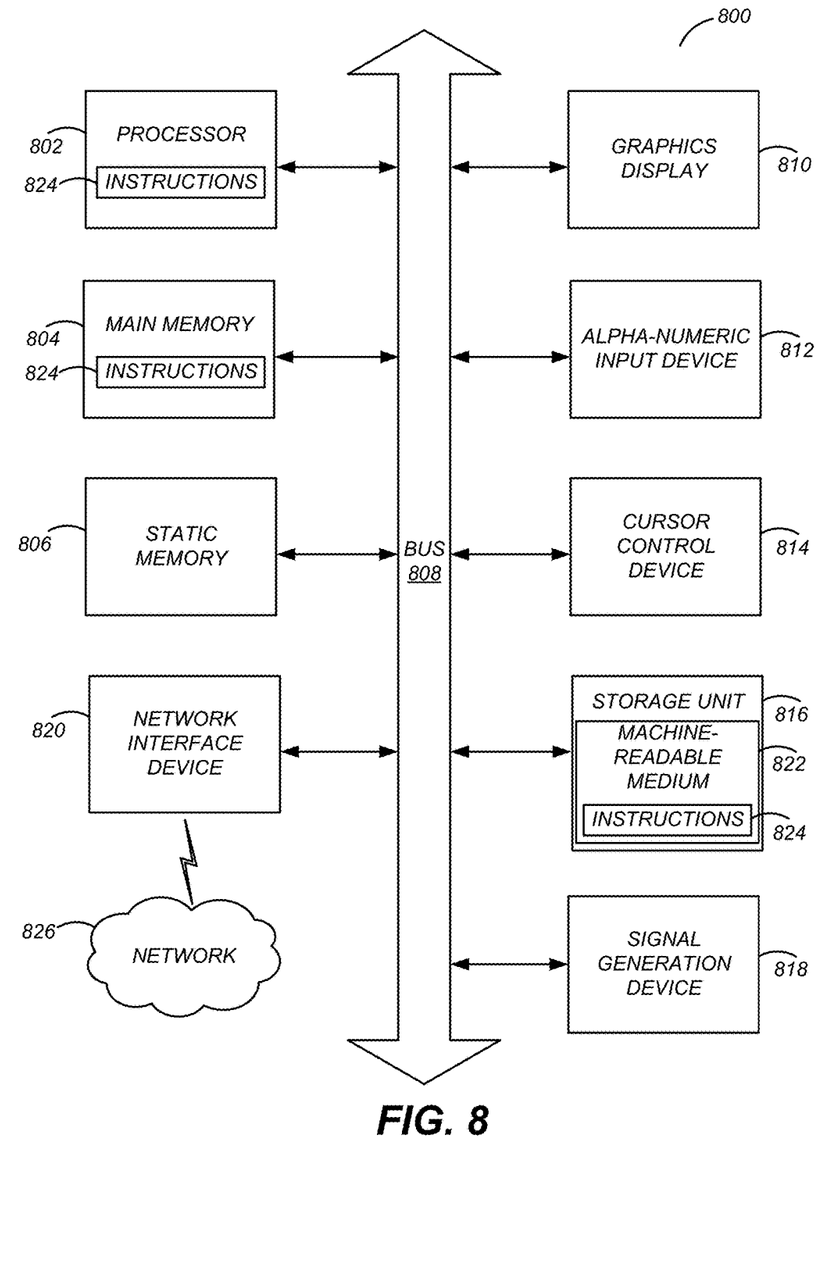
FIG. 8 illustrates components of an example machine able to read instructions from a machine-readable medium and execute them in a processor (or controller) in accordance with an embodiment.

FIG. 8 is a block diagram illustrating components of an example machine able to read instructions from a machine-readable medium and execute them in a processor (or controller). Specifically, FIG. 8 shows a diagrammatic representation of a machine in the example form of a computer system 800 within which instructions 824 (e.g., software or program code) for causing the machine to perform any one or more of the methodologies discussed herein, e.g., with FIGS. 1-7, may be executed. For example, the computer system 800 may be implemented as the content server 110, the client device 120, or the content storage 150. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processors (generally, processor 802) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" may include any non-transitory storage medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Advantageously, a video including different frames with varying number of stationary objects or moving objects can be adaptively compressed. As a result, over-compressing or under-compressing of different frames of the video can be eschewed.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A computer based method comprising:
receiving, by the computer, an input video data of a video, the video including a plurality of frames;
generating, by the computer, a first hash image data of a first frame of the plurality of frames;
generating, by the computer, a second hash image data of a second frame of the plurality of frames;
determining a number of pixels of the first frame having brightness below a brightness threshold,
generating, by the computer, a control value based on a comparison between the first hash image data and the second hash image data and based on the number of pixels having luminance below the threshold; and
encoding, by the computer, the input video data according to the control value, encoding the input video data comprising compressing the input video data according to a compression rate determined based on the control value.

2. The method of claim 1, wherein generating the control value comprises:
determining a hamming distance between the first hash image data and the second hash image data, and
wherein the control value is generated based on the hamming distance.

3. The method of claim 1, wherein the compression rate is proportional to the hamming distance.

4. The method of claim 1, further comprising:
obtaining a difference between a first peak signal to noise ratio (PSNR) of the first frame and a second PSNR of the second frame,
wherein the control value is generated further based on the difference between the first PSNR and the second PSNR.

5. The method of claim 1, wherein the control value is generated further based on a variance between a pixel of the first frame and the pixel of the second frame.

6. The method of claim 1, wherein the encoding is performed by a H.264 encoder, and the control value is a constant rate factor (CRF).

7. The method of claim 1, wherein the second frame is received subsequent to the first frame.

8. A video compressing system comprising:
a hash image generator configured to:
receive an input video data of a video, the video including a plurality of frames,
generate a first hash image data of a first frame of the plurality of frames, and
generate a second hash image data of a second frame of the plurality of frames;
an encoding controller coupled to the hash image generator, the encoding controller configured to:
determine a number of pixels of the first frame having brightness below a brightness threshold,
generate a control value based on a comparison between the first hash image data, the second hash image data and based on the number of pixels having luminance below the threshold; and
an image encoder coupled to the hash image generator and the encoding controller, the image encoder configured to:
receive the input video data of the video,
receive the control value from the encoding controller, and
encode the input video data according to the control value, encoding the input video data comprising compressing the input video data according to a compression rate determined based on the control value.

9. The system of claim 8,
wherein the encoding controller is further configured to determine a hamming distance between the first hash image data and the second hash image data, and
wherein the encoding controller is configured to generate the control value based on the hamming distance.

10. The system of claim 9,
wherein the compression rate is proportional to the hamming distance.

11. The system of claim 8, wherein the image encoder is a H.264 encoder, and the control value is a constant rate factor (CRF).

12. The system of claim 8, further comprising a register coupled between the hash image generator and the encoding controller, the register configured to store the first hash image data, and output the first hash image data to the encoding controller while the hash image generator outputs the second hash image data to the encoding controller.

13. A non-transitory computer readable medium storing instructions, when executed by a processor cause the processor to:
receive an input video data of a video, the video including a plurality of frames;
generate a first hash image data of a first frame of the plurality of frames;
generate a second hash image data of a second frame of the plurality of frames;
determine a number of pixels of the first frame having brightness below a brightness threshold,
generate a control value based on a comparison between the first hash image data, the second hash image data and based on the number of pixels having luminance below the threshold; and
encode the input video data according to the control value, encoding the input video data comprising compressing the input video data according to a compression rate determined based on the control value.

14. The non-transitory computer readable medium of claim 13, wherein the instructions when executed that cause the processor to generate the control value further comprise instructions that cause the processor to:
determine a hamming distance between the first hash image data and the second hash image data, and
wherein the control value is generated based on the hamming distance.

15. The non-transitory computer readable medium of claim 14,
wherein the compression rate is proportional to the hamming distance.

16. The non-transitory computer readable medium of claim 13, wherein the encoding is performed by a H.264 encoder, and the control value is a constant rate factor (CRF).

* * * * *